(12) United States Patent
Vollrath et al.

(10) Patent No.: US 8,352,305 B2
(45) Date of Patent: Jan. 8, 2013

(54) AUTOMATED BROADCAST ADVERTISING TRANSACTION SYSTEM AND METHOD

(75) Inventors: Albert Vollrath, Evanston, IL (US); Stephen Poulin, New York, NY (US)

(73) Assignee: Starcom Mediavest Group, Inc., Chicago, IL (US)

( * ) Notice: Subject to any disclaimer, the term of this patent is extended or adjusted under 35 U.S.C. 154(b) by 846 days.

(21) Appl. No.: 11/542,537

(22) Filed: Oct. 2, 2006

(65) Prior Publication Data

US 2007/0219864 A1 Sep. 20, 2007

Related U.S. Application Data

(60) Provisional application No. 60/722,795, filed on Sep. 30, 2005, provisional application No. 60/741,102, filed on Nov. 30, 2005.

(51) Int. Cl.
*G06Q 10/00* (2012.01)

(52) U.S. Cl. ..... 705/7.22; 705/14.43; 705/72; 705/26.5; 705/28

(58) Field of Classification Search ......................... None
See application file for complete search history.

(56) References Cited

U.S. PATENT DOCUMENTS

| | | | |
|---|---|---|---|
| 5,791,432 A | 8/1998 | Fushimi et al. | |
| 5,870,733 A | 2/1999 | Bass et al. | |
| 6,026,368 A | 2/2000 | Brown et al. | |
| 6,260,047 B1 | 7/2001 | Fox et al. | |
| 6,338,043 B1 * | 1/2002 | Miller | 705/14.69 |
| 6,567,824 B2 | 5/2003 | Fox | |
| 6,873,969 B2 | 3/2005 | Stone et al. | |
| 6,937,996 B1 * | 8/2005 | Forsythe et al. | 705/16 |
| 7,039,930 B1 * | 5/2006 | Goodman et al. | 725/22 |
| 7,689,590 B2 * | 3/2010 | Fox | 707/999.107 |
| 2002/0083444 A1 | 6/2002 | Blasko et al. | |
| 2002/0184088 A1 | 12/2002 | Rosenberg | |
| 2003/0050827 A1 * | 3/2003 | Hennessey | 705/10 |
| 2003/0074283 A1 | 4/2003 | Lee et al. | |
| 2003/0149634 A1 * | 8/2003 | Hyun | 705/26 |
| 2003/0154142 A1 | 8/2003 | Ginsburg et al. | |
| 2003/0177026 A1 | 9/2003 | Purcell | |
| 2003/0212602 A1 | 11/2003 | Schaller | |
| 2004/0093286 A1 * | 5/2004 | Cooper et al. | 705/28 |
| 2004/0216157 A1 * | 10/2004 | Shain et al. | 725/42 |
| 2005/0283795 A1 * | 12/2005 | Steelberg et al. | 725/32 |

FOREIGN PATENT DOCUMENTS

WO  WO 97/12486  4/1997

* cited by examiner

*Primary Examiner* — Jonathan G Sterrett
*Assistant Examiner* — Tzu-Hsiang Lan
(74) *Attorney, Agent, or Firm* — R. Blake Johnston, Esq.; DLA Piper LLP (US)

(57) ABSTRACT

A system and method for synchronizing broadcast advertising inventory data between a broadcast vendor system and a media buyer's media resource planning system features a database that stores advertising inventory data received from the broadcast vendor system and the media buyer's resource planning system. A matching application in communication with the database performs a comparison between a previous package of advertising inventory data and a revised package of advertising inventory data. An analysis application in communication with the matching application and the database enables a user to review results of the comparison and directs uploading of the revised package of advertising data from the database to the media buyer's resource planning system.

21 Claims, 13 Drawing Sheets

Fig. 4

| Tier | Serial | Product | Program | Week | Cost* | Sec.s | Cost / Sec* |
|---|---|---|---|---|---|---|---|
| 1 | x |  | x | x | x | x | x |
| 2 |  | x | x | x | x | x | x |
| 2 |  |  | x | x | x | x | x |
| 3 | x |  |  | x | x | x | x |
| 3 |  | x |  | x | x | x | x |
| 3 |  |  |  | x | x | x | x |
| 4 | x |  | x |  | x | x | x |
| 4 |  | x | x |  | x | x | x |
| 4 |  |  | x |  | x | x | x |
| 5 | x |  | x | x |  | x | x |
| 5 |  | x | x | x |  | x | x |
| 5 |  |  | x | x |  | x | x |
| 6 | x |  |  |  | x | x | x |
| 6 |  | x |  |  | x | x | x |
| 6 |  |  |  |  | x | x | x |
| 7 |  |  | x | x |  |  | x |
| 8 |  |  |  |  |  |  |  |

AUTOMATED BROADCAST ADVERTISING TRANSACTION SYSTEM AND METHOD

CLAIM OF PRIORITY

This application claims priority to U.S. provisional patent application No. 60/722,795, filed Sep. 30, 2005, and U.S. provisional patent application No. 60/741,102, filed Nov. 30, 2005.

BACKGROUND

The present invention relates generally to the management of advertising media and, more particularly, to the management of the inventory and invoicing of advertising time on broadcast media.

In the advertising media industry, corporations and other businesses ("clients") purchases broadcast advertising time or spots from media buying companies ("buyers"). More specifically, clients and buyers agree on a broadcast media buying plan on an annual basis. The buyer then negotiates deals on a quarterly basis with cable networks ("networks" or "vendors") or other broadcasting vendors, such as over-the-air broadcast television and radio and satellite television and radio, to meet the requirements of the media buying plan. Buyers typically operate a media resource planning system, such as Donovan Data Systems (DDS) Netpak, to assist in managing media campaigns. Such a system processes billings to clients, posts their payments and processes invoices from broadcast vendors and payments to them.

The advertising media landscape is changing very rapidly including increases in cable television advertising investment by businesses. Cascading from this, advertising time inventory is being exchanged at higher frequencies and unit (of advertising time) volume is increasing. This is making it increasingly difficult for buyers to ensure that client advertising dollars are invested as intended. In addition, the paper-based flow of unit inventory tracking is driving up labor costs and the turn-around or cycle time for invoice processing by buyers as they attempt to resolve discrepancies between advertising time units purchased and the actual advertising time units provided by the networks.

To reduce the invoice cycle time, buyers need to reduce the number of discrepant invoices for clients. To reduce the number of discrepant invoices, and address other shortcomings of a paper-based invoice tracking system, buyers require a system and method that automates synchronization of unit inventory between the buyers' media resource planning systems and cable networks' systems. Such a system and method would act as a bridge between the buyers' media resource planning systems and the cable network systems so that the data relating to the inventory of advertising time available for cable networks stored on the computer systems is automatically synchronized on a daily basis. The present invention offers such a system and method.

BRIEF DESCRIPTION OF THE DRAWINGS

FIG. 4 is a table illustrating the 8-way matching tiers in an embodiment of the system and method of the present invention;

FIGS. 7a-7c illustrate the invoice processing screens presented to a user in an embodiment of the system and method of the present invention;

DESCRIPTION OF EMBODIMENTS

Figure 1:
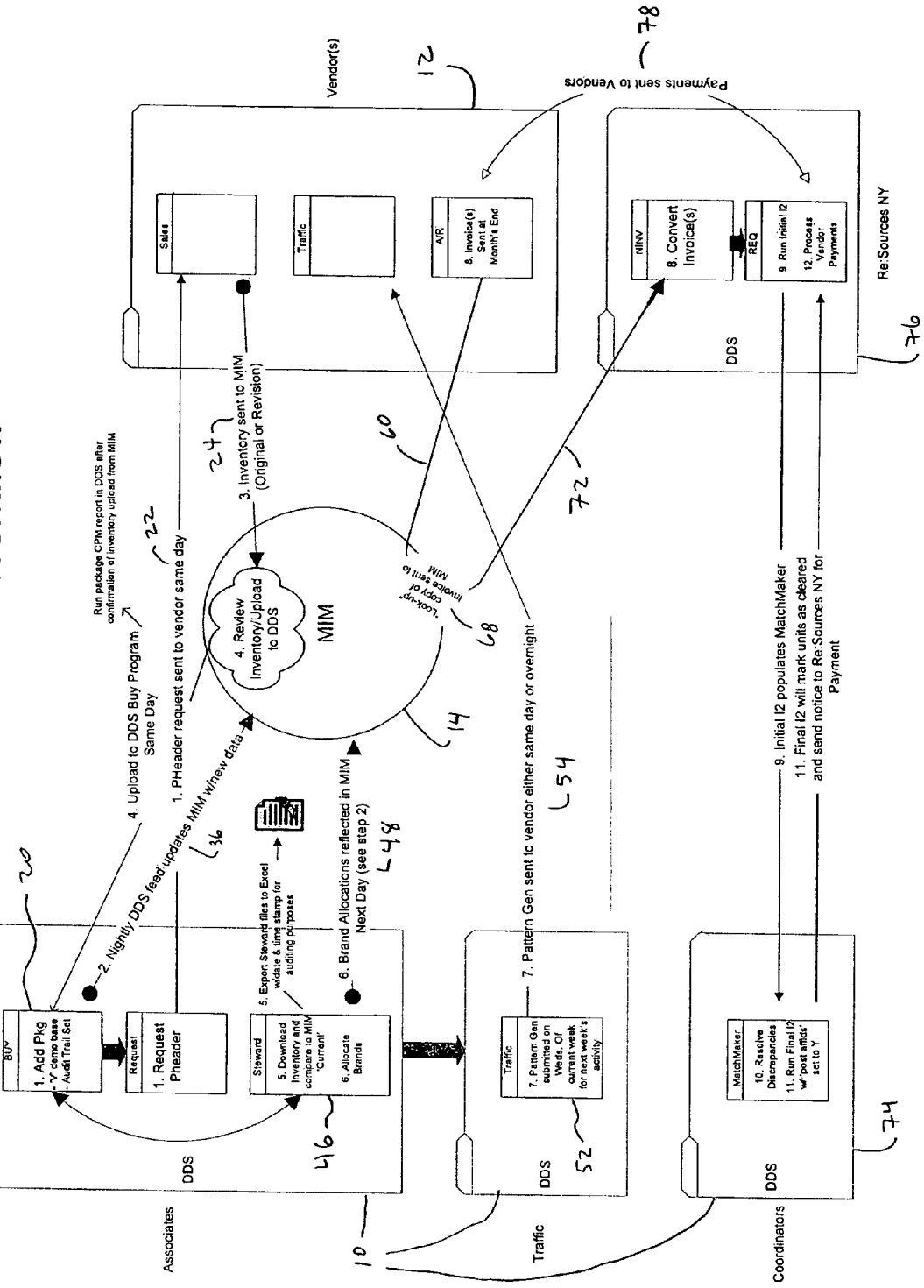
FIG. 1 is a flow diagram illustrating the workflow of an embodiment of the system and method of the present invention.
Figure 2:
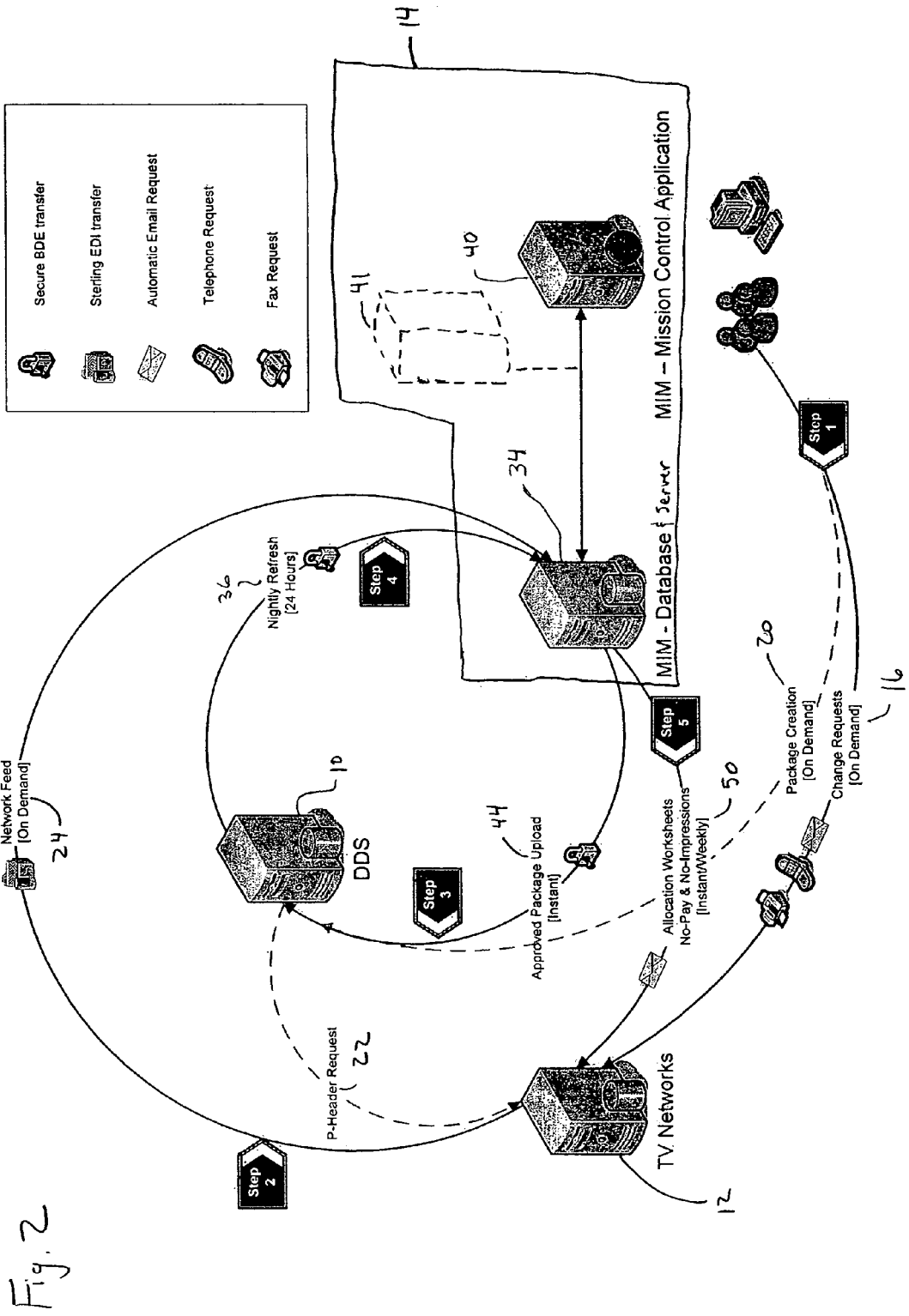
FIG. 2 is a flow diagram illustrating the workflow of FIG. 1 in terms of the system of the present invention, a network system and a buyer media resource planning system.

The workflow of an embodiment of the system and method of the present invention, in relation to a buyer's media resource planning system ("DDS") and a network's computer system, is illustrated in FIGS. 1 and 2. More specifically, the buyer's DDS system is indicated at 10 in FIGS. 1 and 2, while the network system is indicated at 12 and the system of the present invention ("MIM") is indicated at 14. As an example only, the MIM and DDS systems may communicate via a local area network, another network such as the Internet or other data transmission systems known in the art. The MIM and DDS systems may communicate with the network system via a network such as the Internet or other data transmission systems known in the art.

While the invention is described below in terms of use with a cable television network and DDS Netpak as the media resource planning system, it is to be understood that the system and method of the present invention could be used with other types of broadcast advertising media, including, but not limited to, over-the-air broadcast television and radio and satellite television and radio, and media resource planning systems.

The purchase of cable television advertising time is a combination of annual, quarterly and monthly transactions. On an annual basis, a client sends a budgeted amount for media buys to a buyer. The buyer presents to the client various scenarios for buying broadcast media to meet the budgets. The client and buyer then agree to a media buying plan. The buyer then negotiates deals with cable networks to fulfill the media buying plan.

On a quarterly basis, the client advises the buyer of any "options", i.e. the amount by which to reduce the media buys. As illustrated at 16 in FIG. 2, the buyer then advises the cable networks of the reduction in purchases for the quarter. Each cable network responds with a flowchart that shows the dollars and inventory split out as number of units (30 second blocks of advertising time) by program by week in the quarter. There may be negotiation back and forth between the buyer and cable networks to arrive at an acceptable flowchart.

Acceptance of the flowchart is signaled by the buyer creating a package for a quarter in DDS, as illustrated at 20 in FIGS. 1 and 2, and a corresponding PHeader (technical parameters of the package in DDS). The package contains units of advertising time (a unit typically equals 30 seconds of advertising time). As illustrated at 22 in FIGS. 1 and 2, the buyer then sends the PHeader to a cable network. While the discussion below is presented in terms of a single cable network, it is to be understood that the process applies to multiple cable networks that all interact with the MIM system.

Figure 3:
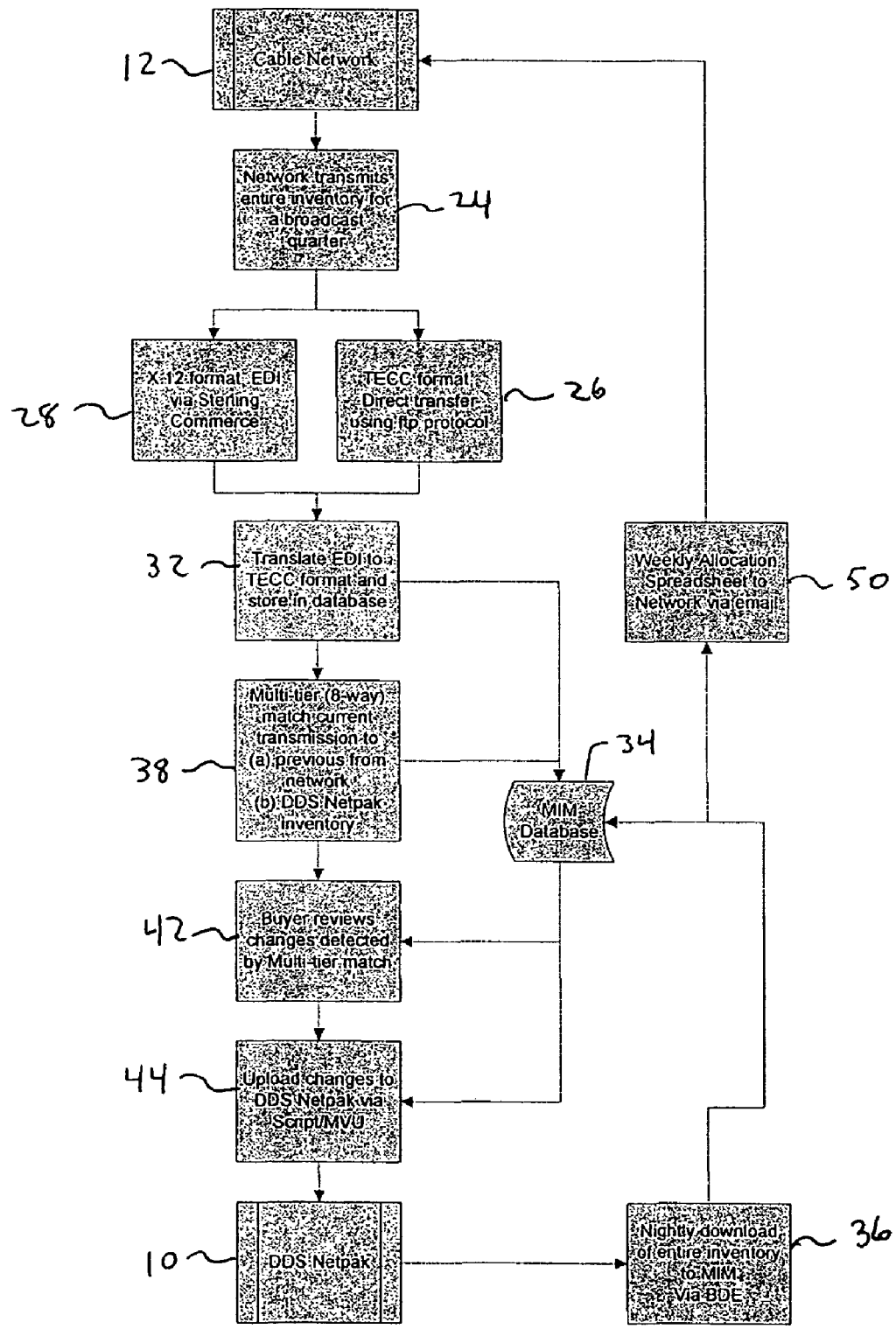
FIG. 3 is a flow chart illustrating the workflow of the inventory processing portion of an embodiment of the system and method of the present invention.

Receipt of the PHeader allows the cable network to send an original or initial inventory for the quarter, in other words, an original or initial package, to the system of the present invention, as indicated at 24 in FIGS. 1, 2 and 3. As indicated at 26 and 28 in FIG. 3, respectively, the package may be sent in TECC flat file format or an X.12 format EDI feed via Sterling Commerce. If the latter format is used, the EDI feed is translated into TECC flat file format, as indicated at 32 in FIG. 3. The package is then stored in the MIM system database, which is indicated at 34 in FIGS. 2 and 3 and should be understood to include a database server.

The transmission of the original package for a quarter establishes the financial commitment to the cable network and the audience delivery commitment from the cable network. As an example of timing, the 1st Quarter 2007 inventory or package may be sent around the middle of October 2006.

As illustrated in FIG. 1, the PHeaders created during a day are downloaded from DDS 10 into the MIM database 34 during a nightly refresh or update 36. As indicated at 38(*b*) in FIG. 3, a software application of the MIM system compares the header of the original package to the PHeaders in the MIM database to determine if the original package has valid codes. As indicated at 42 in FIG. 3, a user (buyer employee) reviews the results of the comparison using an analysis screen that is displayed via a "mission control" or analysis application 40. If the package features valid header codes, the user approves the package, marks it as original and uploads it to the DDS system, as indicated at 44 in FIGS. 2 and 3. The header comparison application may be resident on the same server 40 as the mission control application, or it may reside on a different server, indicated in phantom at 41 in FIG. 2, that also communicates with the MIM database 34.

The original package uploaded into DDS does not have a product designated for the advertising units of the package. As indicated at 46 in FIG. 1, the "Steward" application of the DDS system 10 allocates brands or products to the advertising units of the original package and, as indicated at 48, the updated packages are downloaded to MIM with the nightly update 36.

After an initial or original package is submitted by a cable network to the buyer, the package will typically require updating as programming changes and other occurrences will require that the cable network make changes regarding the advertising units of the package. As a result, the cable networks will transmit revised versions of the original package in the same manner used for the original package (24 in FIGS. 1-3 and 26, 28 and 32 in FIG. 3). After the revised package is received by the MIM database (34 in FIGS. 2 and 3), it is compared with either the original package or the last version of the package received by the MIM database, as indicated at 38 in FIG. 3.

In addition to checking for a valid header for the package at 38(*b*), the MIM system uses a multi-tier (8-way) match to compare the revised package with either the original package or the last version of the package received by the MIM database from the cable network, as indicated at 38(*a*). The multi-tier (8-way) matching application may be resident on the same server as the mission control application (40 in FIG. 2), or it may reside on a different server, indicated in phantom at 41 in FIG. 2, that also communicates with the MIM database 34. This 8-way match is illustrated by the table of FIG. 4, where the columns of the table represent the fields of the units that make up a package. There are 8 tiers to the match logic summarized in the table of FIG. 4 and described below.

In addition to the fields identified in the columns of table of FIG. 4, all matches are done within unique inventory sets identified by a cable network ID, an agency ID, a client code, an estimate no. and a package no. All matches include a comparison of the Cost per Second to within +/−2% even when Cost or Seconds themselves are ignored. Cost per Second never varies for matching units, even if split (splitting a 30 second unit into two 15 second spots), joined (joining two 30 second units into a 60 second spot) or moved to different programs or weeks. The match is done +/−2% to allow for rounding errors. Programs are identified by cable network, broadcast year, broadcast quarter, program name, start time and duration. A Week is the broadcast "week of" identified by the date of the Monday of the week.

In performing the 8-way match, the MIM system compares the units of the packages that are being compared for the applicable tier starting from the top of the table of FIG. 4, beginning with Tier 1, and progressing to the bottom of the table of FIG. 4, ending with Tier 8. As illustrated in the table of FIG. 4, the tiers of the 8-way match are as follows:

Tier 1: Exact match by Network Serial Number (plus Program, Week, Cost and Seconds [length]).

Tier 2: Match by Program, Week, Cost and Seconds—Essentially an exact match, but finds units that have changed products.
  a. With matching Product code
  b. Without matching Product code Tier 3: Match by Week, Cost and Seconds (i.e., ignoring Program)—Detects units that have moved programs within a week.
  a. With matching Serial Number
  b. With matching Product code
  c. With matching Program Tier 4: Match by Program, Cost and Seconds (i.e., ignoring Week)—Detects units that have moved across weeks within the same program.
  a. With matching Serial Number
  b. With matching Product code
  c. Without Serial Number nor Product code Tier 5: Match by Program, Week and Seconds (i.e., ignoring Cost)—Detects units that have been re-priced.
  a. With matching Serial Number
  b. With matching Product code
  c. Without Serial Number nor Product code Tier 6: Match by Cost and Seconds (i.e., ignoring Product and Week)—Detects units that have moved to new weeks and programs.
  a. With matching Serial Number
  b. With matching Product code
  c. Without Serial Number nor Product code Tier 7: Match by Program and Week (i.e., ignoring Cost and Seconds—This tier detects split units (e.g., 1 unit of 30 seconds is matched to 2 units of 15 seconds), and/or joined units (e.g., 2 units of 30 seconds are matched to 1 unit of 60 seconds).

Tier 8: The residue of units that cannot be matched. Any from the previous feed are flagged as deletions (pre-empts), and units from the new feed are flagged as insertions.

As a result of the 8-way match, the revised package, which has been compared by the match to either the original package or the last revised package received by the MIM database from the cable network, is assigned the appropriate tier number (1-8). This tier number is reviewed by a user (employee of the buyer) using the analysis screens of the MIM system as described below and indicated at 42 in FIG. 3.

Figure 5A:
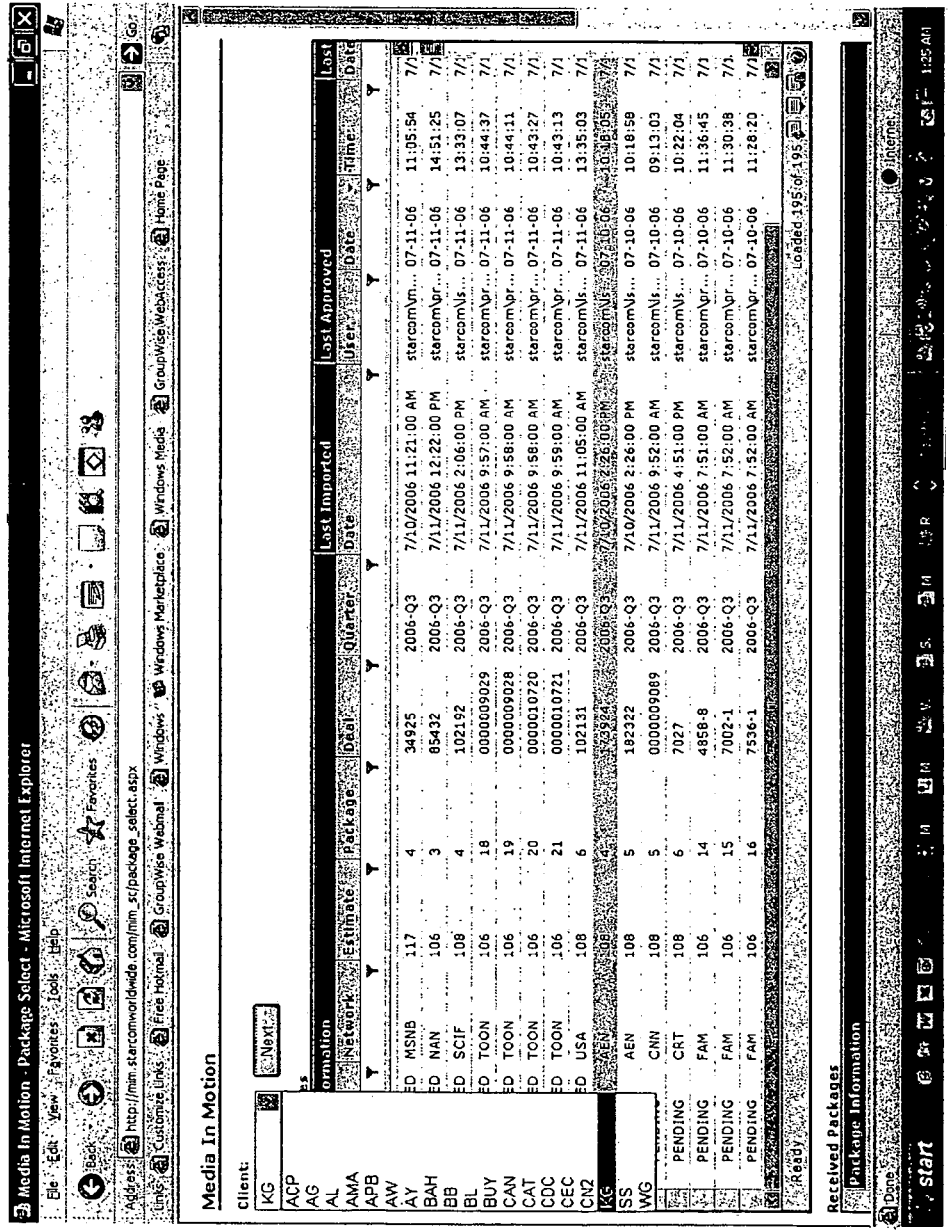
FIGS. 5a-5e illustrate the inventory analysis screens presented to a user in an embodiment of the system and method of the present invention.
Figure 5B:
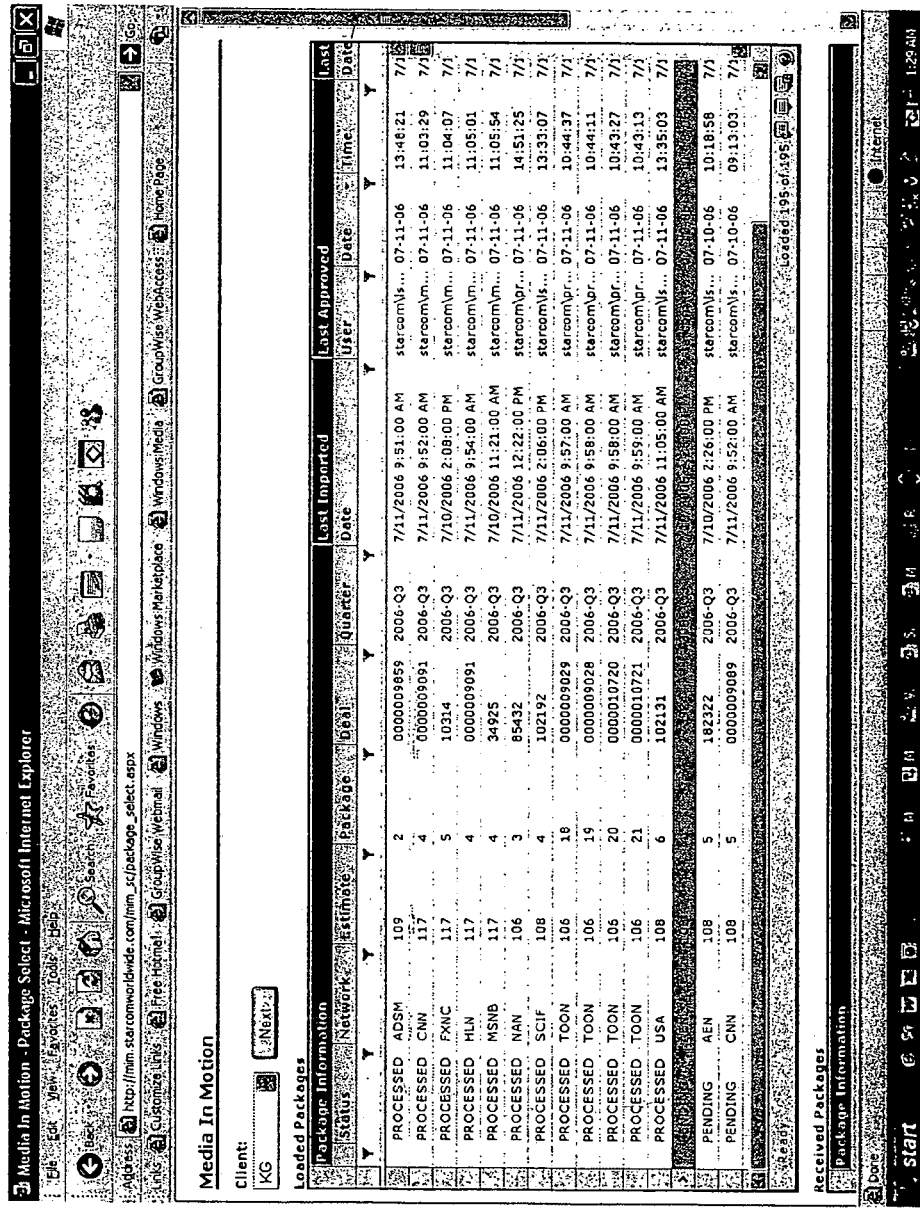

After the 8-way match takes place, a user (buyer employee) may review the results to determine if the revised package is acceptable to the client. New original and revised packages from cable networks are constantly received by the MIM system throughout the day so that whenever the user logs onto the MIM mission control application (40 in FIG. 2), he or she is presented with a listing of packages. To review the packages, with reference to FIG. 5*a*, after the user logs onto the MIM mission control application, he or she first selects a client code from a pull-down menu. As a result, all packages loaded into the MIM database (34 in FIGS. 2 and 3) for the client will be displayed to the user, as illustrated in FIG. 5b for the client having client code "KG". As will be explained below, packages that have been reviewed and approved or rejected by a user are indicated as "Processed" in the first column of the review screen. Packages that have not yet been reviewed by the user are indicated as "Pending."

Figure 5C:
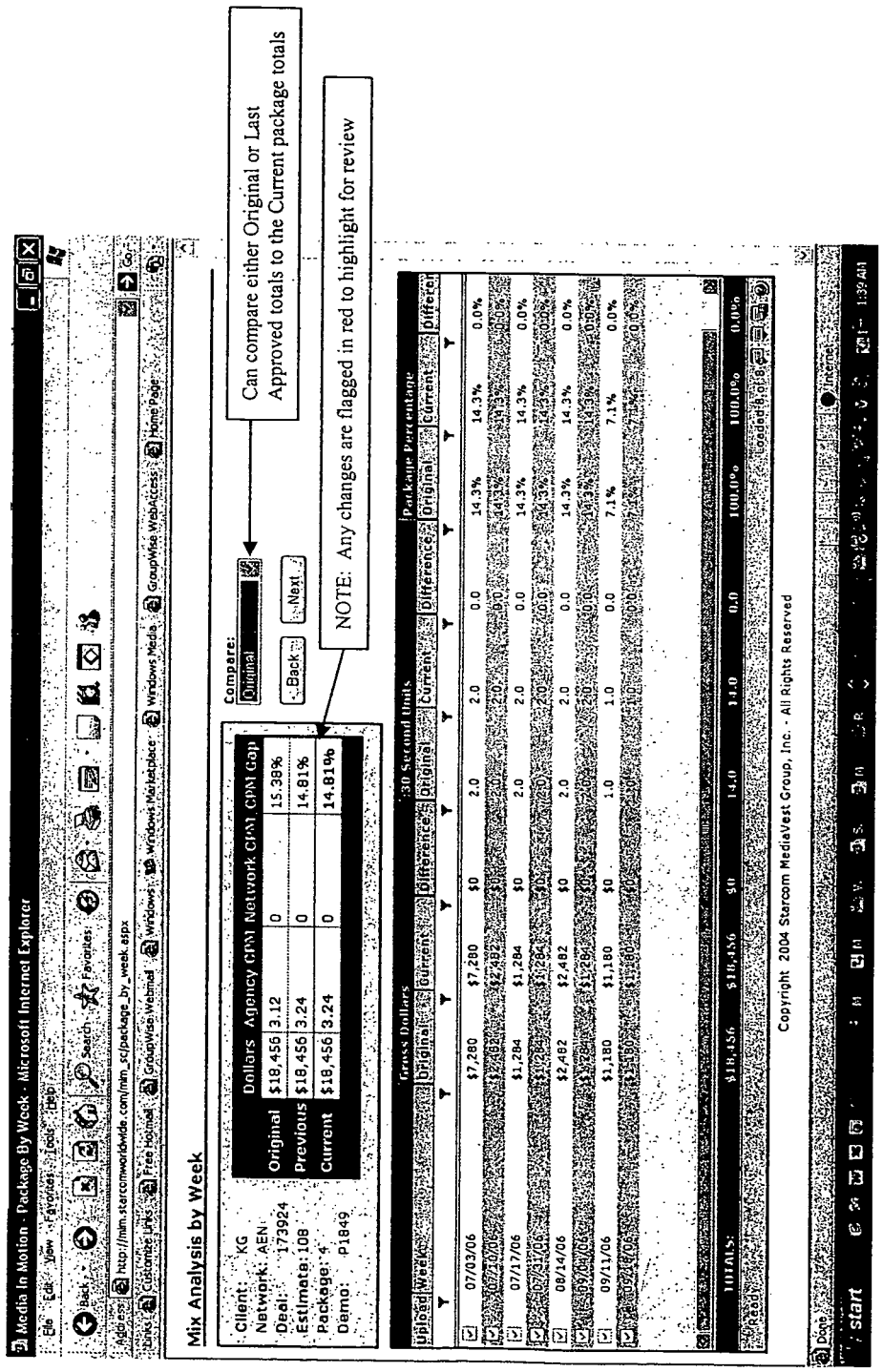
Figure 5D:
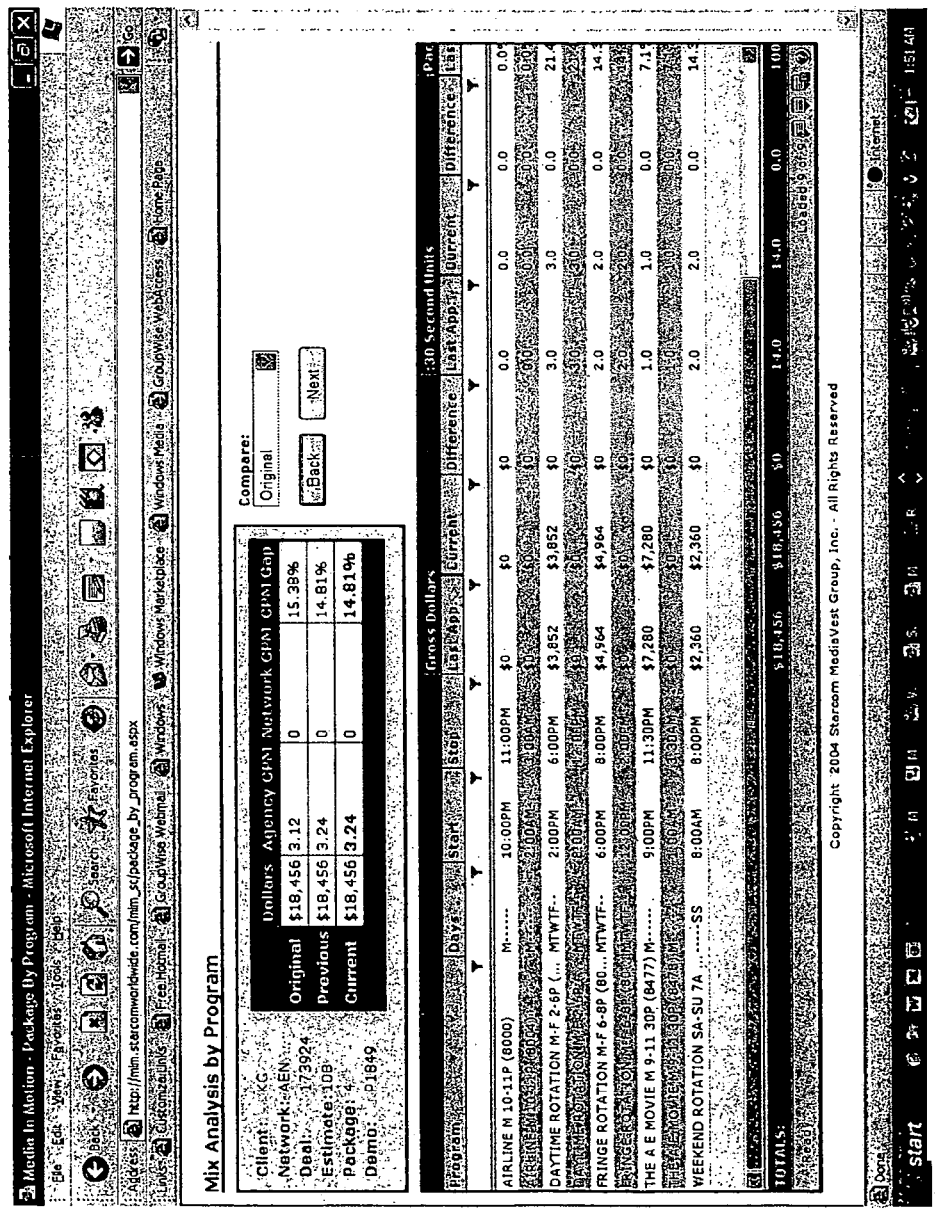

The user selects a "Pending" package from the screen of FIG. 5b and the Mix Analysis by Week screen of FIG. 5c is presented for the selected package. This screen compares total gross dollars, 30 second equivalized units and package percentages between the original or last approved package and the current selected package totals by week. This data is one of the key negotiation points for media buys. After the user analyzes any changes/fluctuations by week, he or she clicks on the "Next" button to perform a Mix by Analysis by Program. The user may click on "Back" to select a different package.

After the user clicks on the "Next" button of FIG. 5c, the Mix Analysis by Program screen of 5d is displayed. This analysis screen allows the user to analyze any inventory changes/fluctuations at the program level. Reviewing the mix of programs is done to ensure that purchased units are not being moved to lower value programs or bad time slots. The user may on the "Back" button to return to the weekly comparison, or may click on the "Next" button to enter the Comparison by Unit screen of FIG. 5e.

Figure 5E:
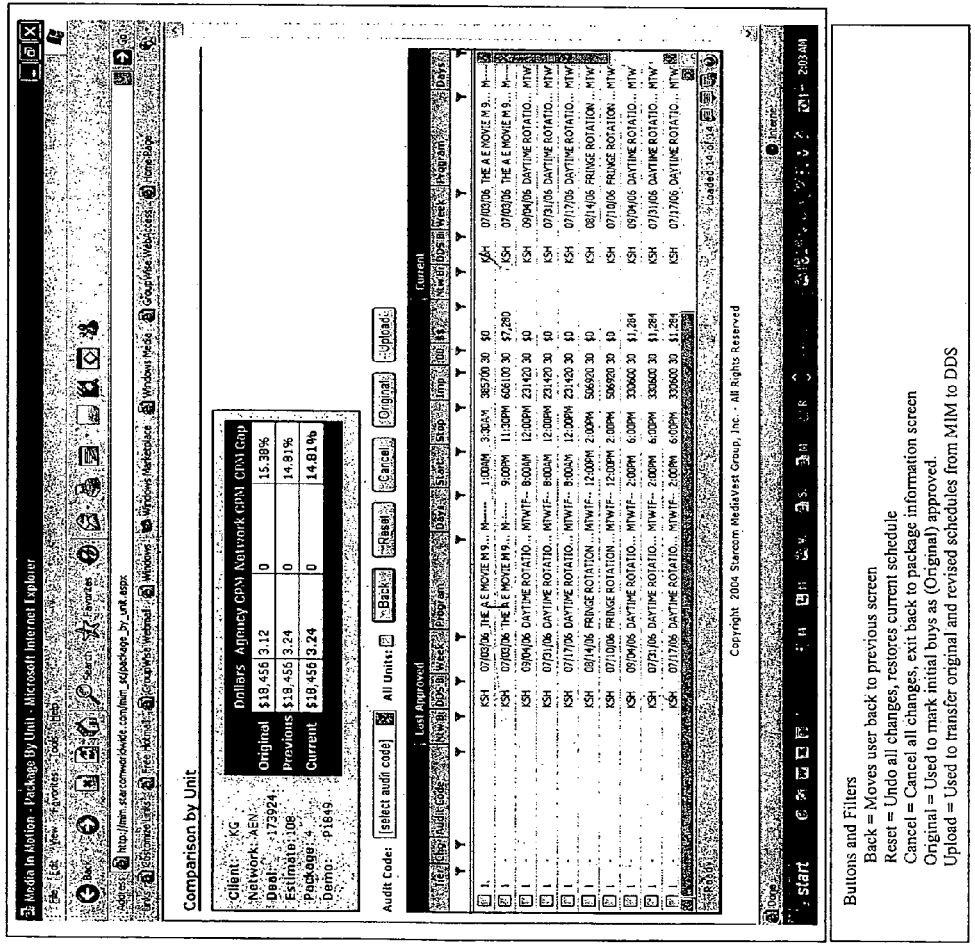

The Comparison by Unit screen of FIG. 5e displays matched units, as detected using the 8-way matching tier logic above. The Comparison by Unit screen is divided into "Last Approved" and "Current Buys" columns. When the units are sent to MIM initially, they are all displayed under the "Current Buys" column. When the units are approved, they move to the "Last Approved" column. The tier column (first column on the left) of the analysis screen of FIG. 5e displays a number 1 through 8 to represent the match status for each unit (each row of the screen of FIG. 5e). The second column of the analysis screen of FIG. 5e is the Change or "Chg" column. This column displays the change status for the unit using one of the following four codes:

D=Deleted unit (row displays in grey)
A=Added unit (row displays in grey)
C=Changed unit (row displays in pink)
——=No change (row displays in white)

Using the analysis screen of FIG. 5e, the user can quickly review units moved across programs, weeks, both programs and weeks or that have been re-priced, split or joined. The user can also use the unit review screen to flag unacceptable units as not to be paid (No-Pay) and/or not to count toward audience delivery guarantees (No-Impressions) via audit codes. More specifically, after the user identifies and reviews revisions using the analysis screen of FIG. 5e, he or she marks each unit with the proper audit code using the "Audit Code" pull-down menu. In order to do so, the user selects the row of the unit of interest and then selects the appropriate audit code (for example: "A" for Approved, "NP" for No-Pay or Not Approved and "NI" for No-Impressions) from the "Audit Code" pull-down menu. The "All Units" box is part of the audit code function and, if checked, MIM will apply the selected audit code to every unit on the screen. If a unit is Approved, the user next selects the "Upload" button near the middle of the screen to accept the unit, and the selected unit is uploaded to the DDS system, as indicated by 44 in FIG. 3. This process is repeated for the units of all pending packages that are approved. Original units, i.e. units that have been received by MIM for the first time, such as with an initial or original package transmission or an added unit, may be indicated by selecting the "Original" button, also near the center of the analysis screen of FIG. 5e.

Once all of the units for a package have been analyzed, approved or rejected and successfully uploaded if approved, the "Status" column of the screen of FIG. 5b changes to "Processed".

As indicated at 50 in FIGS. 2 and 3, an allocation spreadsheet listing the rejected units (No-Pay and No-Impressions) is sent by the MIM system via e-mail to the cable networks on a weekly basis. The spreadsheets may alternatively be sent at other time intervals, such as instantly after analysis by the buyer.

Once the approved packages are uploaded to DDS system, the Steward application (46 in FIG. 1) allocates brands or products to the advertising units where necessary. The updated packages (having units with brands allocated) are downloaded to MIM with the nightly update 36 (illustrated in FIGS. 1, 2 and 3). In addition, accepted packages are processed by the "Traffic" application of DDS, indicated at 52 in FIG. 1, which assigns actual commercials to the units of the accepted packages. This information is transmitted to the cable networks, as indicated at 54 in FIG. 1, preferably on a weekly basis. As an example only, the traffic information may be submitted to the cable network on a Wednesday of the current week for the next week's activity.

The inventory processing portion of the MIM system may optionally include a cable program estimator application program, which may be resident on either server 40 or 41 of FIG. 2. The estimator calculates a program rating for the next quarter by applying a year-over-year ratio, which is calculated using the most recent 3 month's ratings versus the ratings of corresponding months of the previous year. The year-over-year ratio is multiplied by the ratings for the same program during last year's quarter corresponding to the quarter being estimated (i.e. the quarter that the estimate is being created for). More specifically, the estimator may use the following algorithm:

$$\text{Rating} = (MR3/MRYA) * SQYA$$

Where: $MR3$ = the most recent of available 3 months of actual ratings
$MRYA$ = the actual ratings from the same 3 months last year
$SQYA$ = the ratings for the program being estimated from the same quarter last year The estimated rating is useful during analysis performed using the screens of FIGS. 5a through 5e and may be uploaded to the DDS system.

Clients are billed by the buyer using the DDS system for advertisement airings on a monthly basis. As an example only, clients may be billed mid-month for the expected airings that month. In addition, client payments are posted to the DDS system as they are received by the buyer.

Figure 6:
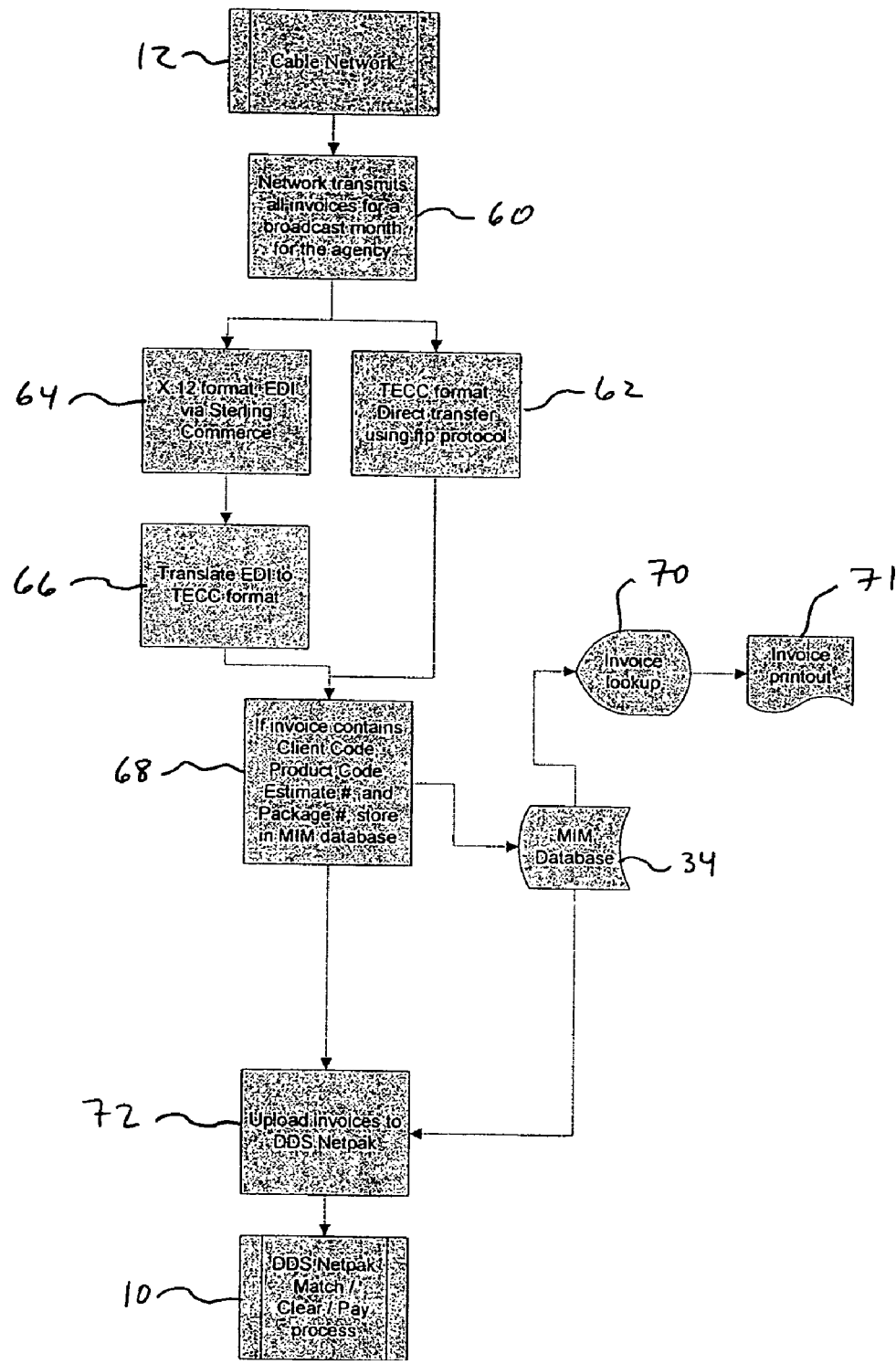
FIG. 6 is a flow chart illustrating the workflow of the invoice processing portion of an embodiment of the system and method of the present invention.

Cable networks send invoices to the MIM system, as indicated at 60 in FIGS. 1 and 6, where they are stored on the system database. As an example only, the invoices for advertisement time aired during the month may be sent at the month's end. As indicated at 62 and 64 in FIG. 6, respectively, the invoices may be sent in TECC flat file format or an X.12 format EDI feed via Sterling Commerce. If the latter format is used, the EDI feed is translated into TECC flat file format, as indicated at 66 in FIG. 6.

Valid cable network invoices feature identifiers including the client code, product code, estimate number and package number. These are preferably obtained by the cable network from the PHeader data transmitted from DDS to the cable network as described above with reference to transfer 22 in FIGS. 1 and 2. As indicated at 68 in FIGS. 1 and 6, the MIM system, using an invoice application that resides on either server 40 or 41 of FIG. 2, checks that the invoice transmitted from the cable network contains a valid client code, product code, estimate number and package number. If so, the invoice is then stored in the MIM system database 34 (FIG. 6).

Figure 7A:
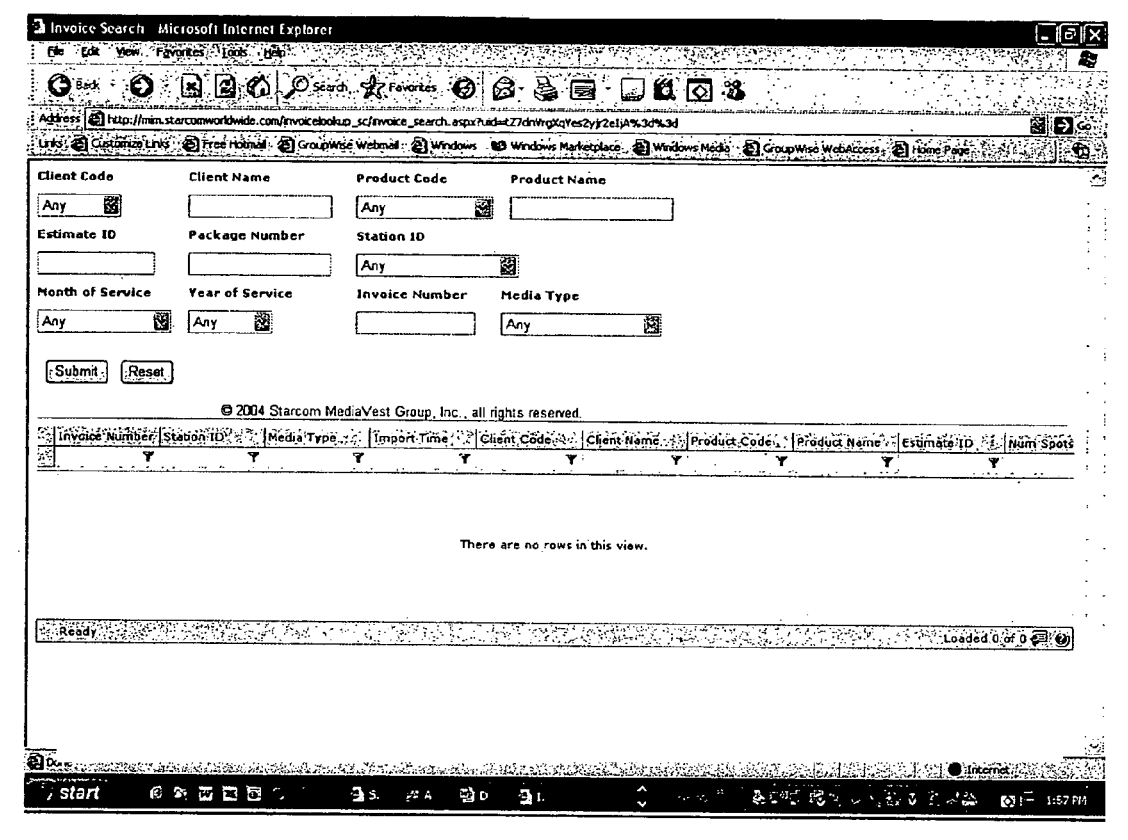
Figure 7B:
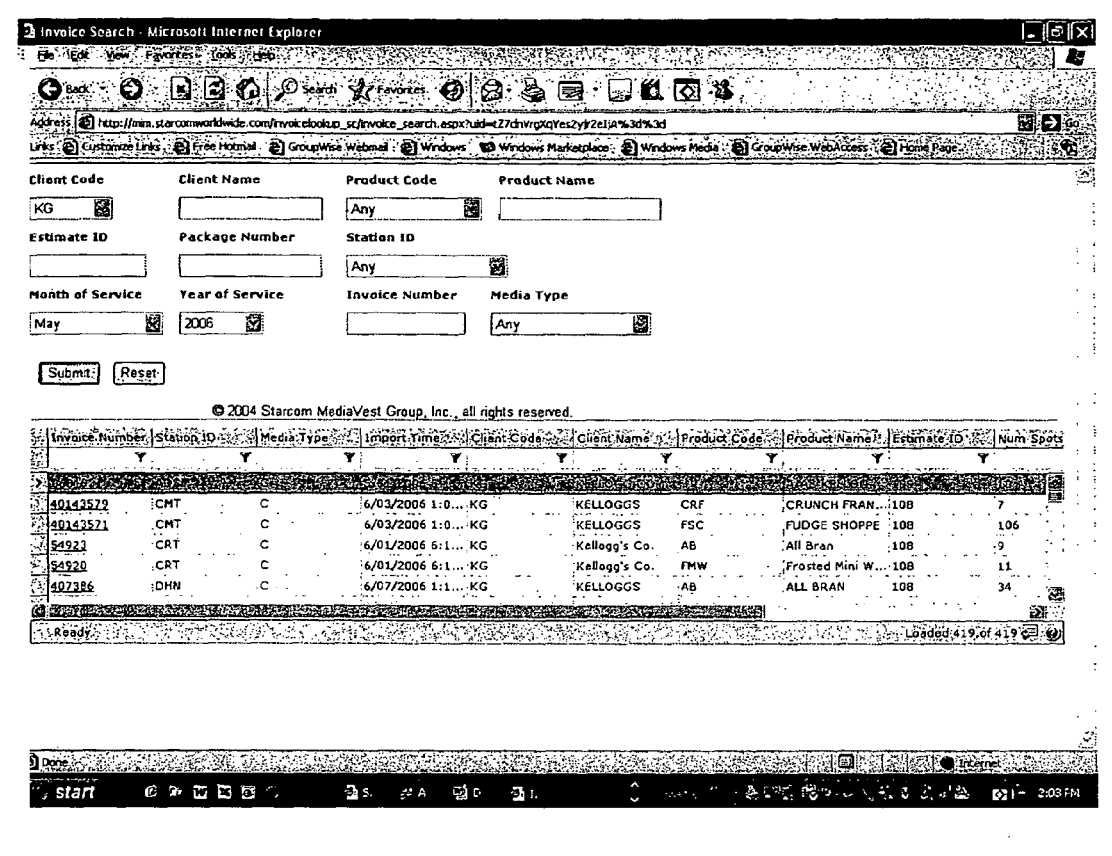
Figure 7C:
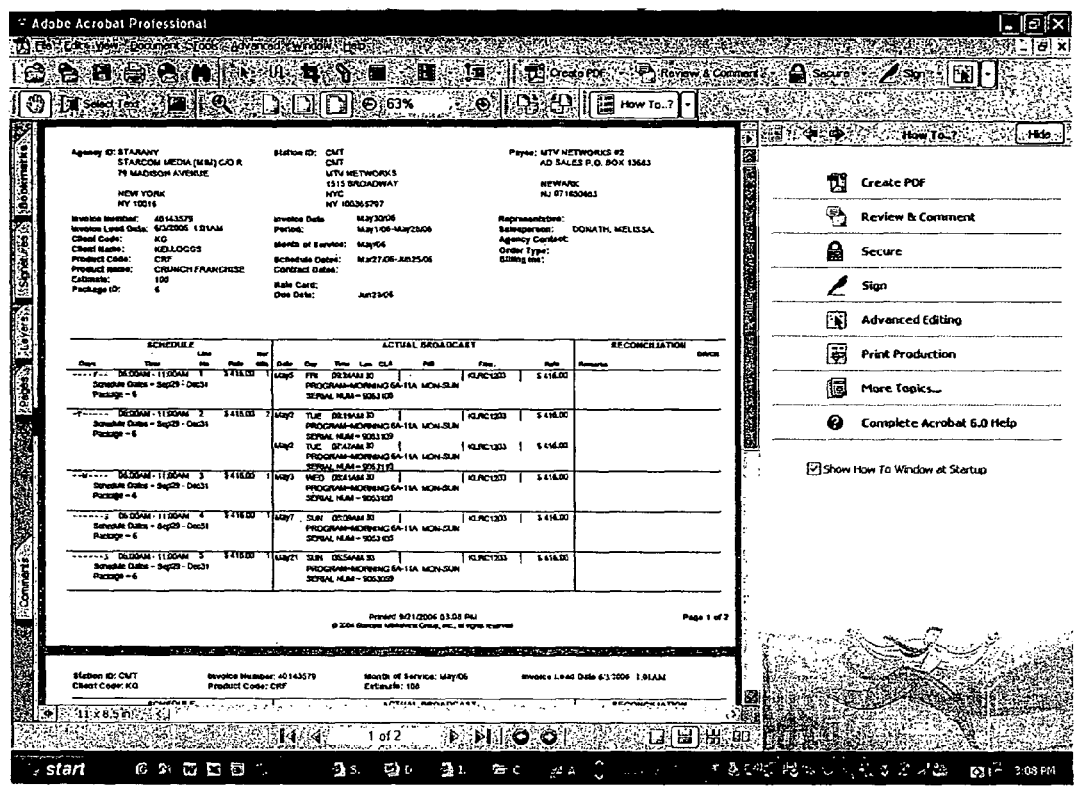

As indicated at 70 and 71 in FIG. 6, the invoice application of the MIM system provides an invoice "Lookup" capability for users. More specifically, as illustrated by the initial Lookup screen presented in FIG. 7*a*, a user can search for invoices by client code/name, product code/name, estimate number, package number, station ID, month/year of service, invoice number or media type. After selecting the appropriate search filters, the user selects the "Submit" button to display a list of invoices, per the request parameters. The invoice items are displayed in the grid on the bottom of the page by invoice number, as illustrated by the screen of FIG. 7*b*. The user may select one of the invoices listed on the screen of FIG. 7*b* to view a printable version of the invoice, as illustrated by the screen of FIG. 7*c*.

As indicated at 72 in FIGS. 1 and 6, the cable network invoices are also passed to DDS from the MIM system for matching with client payments, as indicated at 74 in FIG. 1, and clearing and payment, as indicated at 76 and 78 in FIG. 1. More specifically, the identifiers of the cable network invoices are used in the DDS system to synchronize the invoices with the cable network inventory which, as described above, also features the PHeader identifiers. The identifiers of the cable network invoices are also used in DDS to synchronize the invoices with the bills to be sent to the client (which speeds getting bills out to the client).

While embodiments of the invention have been shown and described, it will be apparent to those skilled in the art that changes and modifications may be made therein without departing from the spirit of the invention.

What is claimed is:

1. A system for synchronizing broadcast advertising inventory data between a broadcast vendor system and a media buyer's media resource planning system comprising:
    a) a computer server adapted to receive original and revised packages of advertising inventory data from the broadcast vendor system and transmit original and revised packages of advertising inventory data to and receive advertising inventory data from the media buyer's resource planning system, said original and revised packages of advertising inventory data including a header, program, week, cost, network serial number, advertising units and product code;
    b) a computer memory storage device in communication with the computer server and upon which is stored a database storing packages of advertising inventory data received by the computer server from the broadcast vendor system and the media buyer's resource planning system;
    c) said server also adapted to:
        i. receive headers including technical parameters of packages of advertising inventory data from the media buyer's resource planning system and the broadcast vendor system; and
        ii. store the headers on the computer memory storage device;
    d) a matching application stored on a computer in communication with the database that performs a comparison between:
        i. a header received from the media buyer's resource planning system and stored in the computer memory storage device and a header received from the broadcast vendor system; and
    a multi-tier comparison between:
        ii. an original package of advertising inventory data and a revised package of advertising inventory data;
        said matching application assigning a tier as a result of the multi-tier comparison based on the following:
            A) tier 1 if exact match by network serial number, program, week, cost and advertising units;
            B) tier 2 if match by program, week, cost and advertising units;
            C) tier 3 if match by week, cost and advertising units;
            D) tier 4 if match by program, cost and advertising units;
            E) tier 5 if match by program, week and advertising units;
            F) tier 6 if match by cost and advertising units;
            G) tier 7 if match by program and week; and
            H) tier 8 if none of network serial number, program, week, cost, advertising units and product code match;
    e) an analysis application stored on a computer in communication with the matching application and the database that enables a user to:
        i. review results of the comparison between the header received from the media buyer's resource planning system and stored in the computer memory storage device and the header received from the broadcast vendor system;
        ii. approve a package corresponding to the header received from the broadcast vendor system, designate the approved package as an original package and transmit the approved package to the media buyer's resource planning system for designating a product for the approved package; and
        iii. review results of the multi-tier comparison of the original package of advertising inventory data and the revised package of advertising inventory data performed by the matching application, including a comparison of headers of the original and revised packages of advertising inventory data, and direct uploading of the revised package of advertising data from the database to the media buyer's resource planning system.

2. The system of claim 1 wherein the broadcast vendor system is a cable television network system.

3. The system of claim 1 wherein the package of advertising data includes units of advertisement time.

4. The system of claim 1 wherein the analysis application enables a user to review results of the comparison on a weekly basis.

5. The system of claim 1 wherein the analysis application enables a user to review results of the comparison on a product basis.

6. The system of claim 1 wherein the analysis application enables a user to review result of the comparison on a unit of advertising time basis.

7. The system of claim 1 wherein the database server and database are adapted to receive invoices from the broadcast vendor system.

8. The system of claim 7 further comprising an invoice application in communication with the database that checks invoices received from the broadcast vendor system before they are loaded onto the database.

9. The system of claim 8 wherein the invoice application checks the invoices for a valid client code, product code, estimate number and package number.

10. The system of claim 9 wherein the invoice application is adapted to upload approved invoices to the media buyer's resource planning system.

11. The system of claim 7 further comprising an invoice application in communication with the database that enables a user to lookup and view an invoice.

12. The system of claim 1 further comprising a program estimator application program that calculates a rating for a quarter for a program.

13. A method for synchronizing broadcast advertising inventory data between a broadcast vendor system and a media buyer's media resource planning system comprising the steps of:
  a) providing a computer server;
  b) providing a computer upon which a matching application is stored;
  c) providing a computer upon which an analysis application is stored;
  d) providing a computer memory storage device upon which a database storing packages of advertising inventory data is stored, said database in communication with the computer server and the matching and analysis applications;
  e) receiving an original package of advertising inventory data including a network serial number, program, week, cost, advertising units and product code from the broadcast vendor system to the database via the computer server;
  f) accepting the original package of advertising inventory data from the broadcast vendor system;
  g) receiving a revised package of advertising inventory data including a network serial number, program, week, cost, advertising units and product code from the broadcast vendor system to the buyer's database via the computer server;
  h) comparing the revised package of advertising inventory data to the accepted original package of advertising inventory data using a multi-tier match to determine changes in the advertising inventory data using the matching application;
  i) assigning a tier using the matching application as a result of the multi-tier match based on the following:
    A) tier 1 if exact match by network serial number, program, week, cost and advertising units;
    B) tier 2 if match by program, week, cost and advertising units;
    C) tier 3 if match by week, cost and advertising units;
    D) tier 4 if match by program, cost and advertising units;
    F) tier 5 if match by program, week and advertising units;
    F) tier 6 if match by cost and advertising units;
    G) tier 7 if match by program and week; and
    H) tier 8 if none of network serial number, program, week, cost, advertising units and product cede match;
  j) reviewing the changes using the analysis application to determine if they are acceptable; and
  k) uploading the revised package of advertising inventory data to the media buyer's media resource planning system if the changes are acceptable using the computer server.

14. The method of claim 13 further comprising the step of notifying the broadcast vendor if the changes are not acceptable via the computer server.

15. The method of claim 13 wherein the broadcast vendor system is a cable television network system.

16. The system of claim 1 wherein the matching application and the analysis application are both stored on a single computer.

17. The system of claim 16 wherein the single computer is the computer server.

18. The method of claim 13 herein the matching application and the analysis application are both stored on a single computer.

19. The method of claim 18 wherein the single computer is the computer server.

20. The system of claim 1 wherein the advertising inventory data received from the media buyer's resource planning system includes an updated original package of advertising inventory data including product data, where the updated original package of advertising inventory data is compared by the matching application with the revised package of advertising inventory data.

21. The method of claim 13 further comprising the steps of, after step e) and before step f)
  i. transferring the original package of advertising inventory data from the database to the media buyer's media resource planning system via the computer server;
  ii. transferring an updated original package of updated advertising inventory data that includes product data from the media buyer's media resource planning system to the database via the computer server;
  and wherein step g) includes comparing the revised package of advertising inventory data with the updated original package of advertising inventory data.

* * * * *